Patented Nov. 14, 1944

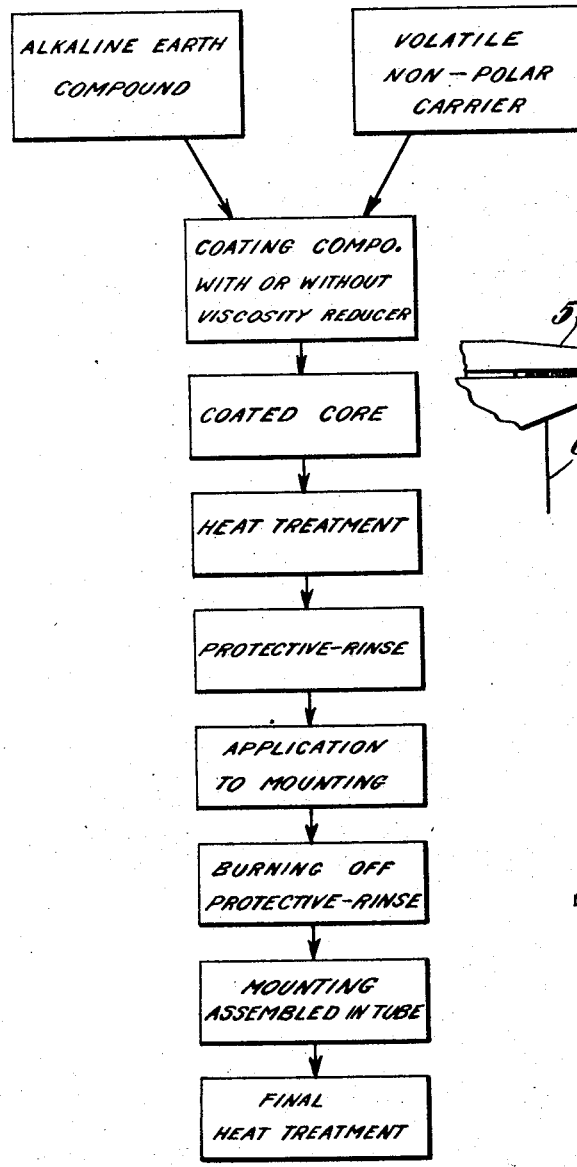
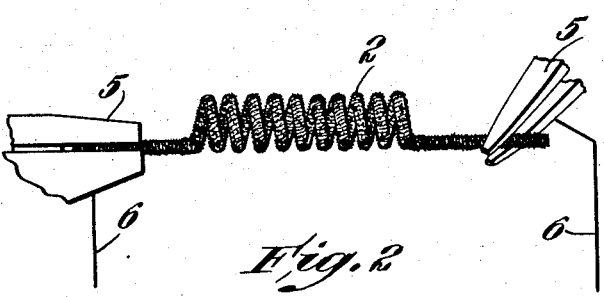
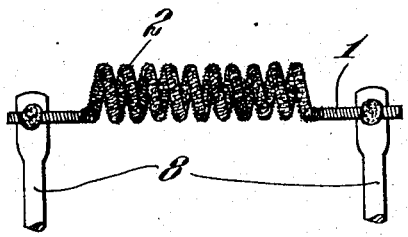
Fig. 1
Fig. 2
Fig. 3
Inventor
Paul W. Stutsman

2,362,510

UNITED STATES PATENT OFFICE 2,362,510

EMISSIVE FILAMENT AND METHOD OF MAKING

Paul W. Stutsman, Waltham, Mass., assignor, by mesne assignments, to Raytheon Manufacturing Company, Newton, Mass., a corporation of Delaware Application January 3, 1942, Serial No. 425,546

10 Claims. (Cl. 176—126)

This invention relates to filaments suitable for electron discharge tubes and the like, and more particularly to an improved method of manufacturing such filaments and the resulting product.

In accordance with conventional practices filaments for electronic tubes are usually prepared by coating the base or core element with a composition comprising one or more alkaline earth compounds dispersed in a vehicle or carrier which is subsequently burned off. In order to obtain optimum emission characteristics it is desirable to maintain as high a ratio of alkaline earth metal to coating compound as possible and to this end it is the desideratum to provide an alkaline earth compounding coating consisting of substantially unadulterated monoxide.

In preparing such filaments according to prevailing practice, the alkaline earth compound, such as the nitrate, oxide, carbonate, hydroxide and/or azide, is dispersed in a carrier comprising a composition which may be readily decomposed at temperatures less than the fusion point of the alkaline earth compound. Such carriers usually fall into one or two classes, viz., relatively polar substances such as cellulose nitrate dissolved in a suitable solvent, or carriers such as wax, resin, gum arabic, guaiac and the like. Polar substances are generally unsatisfactory in that they decompose to form or evolve compounds which react with the alkaline earth compound and consequently "poison" the coating to a greater or lesser extent. On the other hand, such binders as wax, resin, gums, etc., are readily carbonized when heated and, due to natural impurities therein, leave a residue or ash which is likewise apt to poison the coating. In both cases appreciable amounts of extraneous matter are introduced into the coating which impair the life and efficiency of the filaments.

The principal object of the present invention are to overcome the aforementioned objectionable practices and to provide a reliable and efficient method of forming a filament with a uniform coating consisting essentially of an alkaline earth monoxide free from injurious extraneous matter.

Further objects will be apparent from a consideration of the following description and the accompanying drawing, wherein Fig. 1 is a chart showing the steps constituting the preferred procedure in coating a filament in accordance with the present invention;

Fig. 2 is an enlarged elevational view of a filament after the coating operation; and Fig. 3 is a similar view of the coated filament and associated mounts.

In accordance with the present invention, as indicated in Fig. 1, a base or core element such as a filament of tungsten or the like is first coated with a composition comprising one or more monoxides or reducible alkaline earth compounds dispersed in a carrier comprising one or more normally fluid, volatile, relatively non-polar, organic compounds having a volatilization temperature or boiling point substantially less than the sintering temperature or fusion point of the alkaline earth compound employed. Although compounds of this type are well known and the particular selection is primarily a matter of choice, I preferably employ a highly refined liquid petrolatum or white oil, since this material may be obtained at a relatively low cost and, due to its viscosity, readily holds the alkaline earth compounds in suspension.

The consistency of the coating composition may be varied, depending upon the fineness of the alkaline earth compound, the particular carrier selected, and such other factors as are well known to those skilled in the art. Since it is desirable to build up a relatively heavy coat of maximum compound content by, if possible, not more than one application of the coating compound, the proportion of alkaline earth compound to the carrier may be increased to the desired extent until the coating composition reaches a paste-like consistency so that a suitable viscosity reducer may be incorporated to provide a more workable composition. The selection of the viscosity reducer will depend upon the particular carrier used and in any case it should conform to the aforementioned requirements relating to the vehicle, at least in that it should be relatively non-polar and volatile at temperature within the range above specified.

The composition may be applied to the body of the filament in any conventional manner to insure a relatively uniform coating and after application of the composition the coated filament may be subjected to an initial heat treatment which is effective to volatilize the major portion of the carrier, and thereafter to a second or supplemental heat treatment which is effective not only to drive off the residual vehicle, but also to sinter or fuse the alkaline earth compound. If desired, both treatments may be combined by gradually raising the temperature of the coated filament from a point at or below the volatilization point of the carrier to the fusing point of the alkaline earth compound. Where a reducible alkaline earth compound is used, the heat treatment should be such as to effect at least a partial reduction of the compound to the monoxide. Immediately after the above-described heat treatment, the coated filament is immersed in a protective rinse consisting essentially of a compound of the same or similar type as the carrier, except that it is preferably more volatile. The purpose of this step is not only to protect the coated filament against atmospheric hydration, but also to rinse or wash off the coating which may remain on the end portions of the filament in order to obtain clean ends for welding. Since the particular compound used for the protective rinse should be of a relatively non-polar character, readily volatile and a solvent for the carrier, its selection is governed by the carrier used.

The coated filament may remain in the protective rinse until it is assembled with or welded to the filament mounting, and following this step the assemblage may then be subjected to a further heat treatment which is effective to drive off the protective rinse after which the assemblage may be set into the tube and subjected to a final heat treatment to insure complete elimination of the carrier and protective rinse, as well as reduction of the alkaline earth compound and fusion of the particles. From this point on the procedure may be in accordance with any of the conventional practices.

A specific example, illustrative of what is now considered a preferred procedure, is as follows:

A coiled core 1 of tungsten is first immersed in a coating composition which comprises approximately 400 grams of barium oxide dispersed in 120 cc. of refined white mineral oil, such as "Nujol" or the like. The coating composition is of stiff paste-like consistency, and in order to reduce its viscosity, 0.4 cc. of dimethyl phthalate may be added, thereby to produce a composition which is sufficiently workable or fluid to provide a uniform coating 2 on the body portion of the core, as shown in Fig. 3.

Immediately after withdrawing the coated core from the composition, it is mounted in suitable clamps 5 which are electrically connected in a circuit 6, as shown in Fig. 2, so that the filament may be heated when desired. One or both clamps 5 are manipulated so as to expand and retract the convolutions of the core and at the same time an electric current is passed through the core so as gradually to heat it to a temperature of the order of 800° C., after which the core is immersed in a protective rinse consisting of a relatively light oil, such as kerosene or No. 2 fuel oil.

The protective rinse is effective not only to prevent atmospheric hydration of the coated coil, but also to dissolve such residual coating composition as may adhere to the end portion of the core. The coated coil may remain in the rinse until its assemblage with the coil mounts, at which time it is withdrawn and its ends are welded or otherwise secured to the mounts 8 (Fig. 3) in the usual manner.

The assemblage is then subjected to a further heat treatment at a temperature of the order of 800° to 900° C., which treatment is effective to drive off the kerosene, and this operation is preferably carried out in an enclosed chamber under reduced pressure to avoid flashing of the kerosene and possible injury to the coated core. Following this step the assemblage is then set into the tube and subjected to a further heat treatment at a temperature of the order of 1100° C., this treatment being effective to fuse the barium oxide particles, burn off any residues and reduce any barium compounds incidentally formed during the previous heat treatments.

The filament thus produced is characterized by a coating 2 consisting essentially of barium oxide substantially free from polar radicals and extraneous matter which would impair its efficiency or reduce its life. It is found that tubes having a filament made in accordance with the present invention not only start easier and last longer, but also permit higher average and peak current loads than filaments heretofore produced. They are suitable for thermionic as well as for cold cathode apparatus.

While I have shown and described one desirable embodiment of the invention, it is to be understood that this disclosure is for the purpose of illustration and that various changes and modifications may be made, as well as the substitution of indicated equivalents, without departing from the spirit and scope of the invention as set forth in the appended claims.

I claim:

1. In the manufacture of filament for electron discharge tubes and the like, the steps which comprise applying to a metallic core a coating composition comprising an alkaline earth compound dispersed in a carrier consisting essentially of a normally fluid, substantially non-polar organic compound having a volatilization temperature substantially less than the fusion temperature of said alkaline earth compound, and subsequently heat-treating the coated core to burn off the carrier and effect fusion of the particles of the alkaline earth compound.

2. In the manufacture of filament for electron discharge tubes and the like, the steps which comprise applying to a metallic core a coating composition comprising a barium compound dispersed in a carrier consisting essentially of a normally fluid, substantially non-polar organic compound having a volatilization temperature substantially less than the fusion temperature of said barium compound, and subsequently heat-treating the coated core to burn off the carrier and effect fusion of the particles of the barium compound.

3. In the manufacture of filament for electron discharge tubes and the like, the steps which comprise applying to a metallic core a coating composition comprising barium oxide dispersed in a carrier consisting essentially of a normally fluid, substantially non-polar organic compound having a volatilization temperature substantially less than the fusion temperature of said barium oxide, and subsequently heat-treating the coated core to burn off the carrier and effect fusion of the particles of the barium oxide.

4. In the manufacture of filament for electron discharge tubes and the like, the steps which comprise applying to a metallic core a coating composition comprising an alkaline earth compound dispersed in a carrier consisting essentially of liquid petrolatum, and subsequently heat-treating the coated core to burn off the carrier and effect fusion of the particles of the alkaline earth compound.

5. In the manufacture of filament for electron discharge tubes and the like, the steps which comprise applying to a metallic core a coating composition comprising barium oxide dispersed in a carrier consisting essentially of liquid petrolatum having incorporated therein dimethyl phthalate, and subsequently heat-treating the coated core to burn off the carrier and effect fusion of the particles of the barium oxide.

6. In the manufacture of filament for electron discharge tubes and the like, the steps which comprise applying to a metallic core a coating composition comprising an alkaline earth compound dispersed in a carrier consisting essentially of a normally fluid, substantially non-polar organic compound having a volatilization temperature substantially less than the fusion temperature of said alkaline earth compound, subsequently heat-treating to volatilize the major portion of said carrier, immersing the coated filament in a volatile non-polar protective rinse, and thereafter heat-treating to remove said rinse and effect fusion of the particles of the alkaline earth compound.

7. In the manufacture of filament for electron discharge tubes and the like, the steps which comprise applying to a metallic core a coating composition comprising barium oxide dispersed in a carrier consisting essentially of a normally fluid, substantially non-polar organic compound having a volatilization temperature substantially less than the fusion temperature of said barium oxide, subsequently heat-treating to volatilize the major portion of said carrier, immersing the coated filament in a volatile non-polar protective rinse, and thereafter heat-treating to remove said rinse and effect fusion of the particles of the barium oxide.

8. In the manufacture of filament for electron discharge tubes and the like, the steps which comprise applying to a metallic core a coating composition comprising an alkaline earth compound dispersed in a carrier consisting essentially of liquid petrolatum, subsequently heat-treating to volatilize the major portion of said carrier, immersing the coated filament in a volatile non-polar protective rinse, and thereafter heat-treating to remove said rinse and effect fusion of the particles of the alkaline earth compound.

9. In the manufacture of filament for electron discharge tubes and the like, the steps which comprise applying to a metallic core a coating composition comprising barium oxide dispersed in a carrier consisting essentially of liquid petrolatum having incorporated therein dimethyl phthalate, subsequently heat-treating to volatilize the major portion of said carrier, immersing the coated filament in a volatile non-polar protective rinse, and thereafter heat-treating to remove said rinse and effect fusion of the particles of the barium oxide.

10. In the manufacture of filament for electron discharge tubes and the like, the steps which comprise applying to a metallic core a coating composition comprising barium oxide dispersed in a carrier consisting essentially of liquid petrolatum having incorporated therein dimethyl phthalate, subsequently heat-treating to volatilize the major portion of said carrier, immersing the coated filament in a protection rinse consisting of kerosene, and thereafter heat-treating to remove said rinse and effect fusion of the particles of the barium oxide.

PAUL W. STUTSMAN.